(12) United States Patent
Sasaki et al.

(10) Patent No.: US 6,513,617 B2
(45) Date of Patent: Feb. 4, 2003

(54) VEHICLE HOOD APPARATUS

(75) Inventors: Sakae Sasaki; Ken Hanayama; Kaoru Nagatomi, all of Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/911,668

(22) Filed: Jul. 24, 2001

(65) Prior Publication Data

US 2002/0014367 A1 Feb. 7, 2002

(30) Foreign Application Priority Data

Jul. 26, 2000 (JP) ........................................ 2000-226138
Jul. 26, 2000 (JP) ........................................ 2000-226139

(51) Int. Cl.[7] ..................... B60R 21/34; B62D 25/10; B62D 25/12
(52) U.S. Cl. ..................... 180/274; 180/69.21; 296/194; 296/189; 16/290; 16/292; 16/368; 16/222
(58) Field of Search ......................... 180/69.21, 274, 180/281; 296/194, 189; 16/290, 289, 292, 368, 369, 82, 222

(56) References Cited

U.S. PATENT DOCUMENTS 6,182,782 B1 * 2/2001 Matsuura et al. ........... 180/274
6,217,108 B1    4/2001 Sasaki
6,257,657 B1    7/2001 Sasaki
6,345,679 B1 * 2/2002 Sasaki ........................ 180/274

FOREIGN PATENT DOCUMENTS

| DE | 694 00 889 | 3/1997 |
| DE | 100 33 148 | 3/2001 |
| DE | 100 35 105 | 6/2001 |
| EP | 0 630 801 | 11/1996 |
| JP | 09315266 | 12/1997 |
| JP | 10258774 | 9/1998 |
| JP | 10-258774 A * | 9/1998 |
| JP | 11-263191 A * | 9/1999 |
| JP | 11-310157 | 9/1999 |

* cited by examiner

Primary Examiner—Paul N. Dickson
Assistant Examiner—Ruth Ilan
(74) Attorney, Agent, or Firm—Merchant & Gould, P.C.

(57) ABSTRACT

A vehicle hood apparatus is provided with a hood retaining mechanism including a linkage which is bendable and stretchable for retaining a hood in a lifted position when a vehicle collides with an object to be protected and the rear end of the hood is lifted. The linkage has an upper link and a lower link which are bendably and stretchably connected via a hinge. A stopper is included for preventing the lower link from falling rearward relative to the vehicle when the lower link and the upper link stretch. The hood apparatus further includes a ratchet mechanism for preventing the lower link and the upper link from shifting from the stretching state to a bending state to securely retain the lifted hood.

4 Claims, 21 Drawing Sheets

VEHICLE HOOD APPARATUS

BACKGROUND OF THE INVENTION

1. Field of the Invention

The present invention relates to a hood apparatus with a hood for opening and closing the engine room positioned in the front portion of a vehicle.

2. Description of the Related Art

A vehicle hood apparatus is configured to lift a hood a predetermined amount and retain it in the lifted position when a moving vehicle equipped with the apparatus collides with an object to be protected. The lifted hood can deform downward by an increased amount and absorb the collision energy through the deformation by an increased amount, thereby mitigating the impact of a secondary collision between the object to be protected and the top surface of the hood. A vehicle hood apparatus of such a kind is disclosed, for example, in Japanese Patent Laid-Open Publication No. HEI-9-315266.

When the vehicle collides with an object to be protected, this hood apparatus detects the collision with a collision detection sensor provided at the front bumper, raises a rod of a hood lifting and retaining mechanism through a control unit in response to the detection signal to bring a link mechanism upright by the rod, thereby lifting the rear end of the hood a predetermined amount and retaining it in the lifted position.

However, the object to be protected, after the collision with the vehicle, does not always encounter secondary collision with the top surface of the hood. In such a case, however, the lifted hood obstructs the driving vision of the driver. It is preferable that the obstruction of the driving vision by the lifted hood be speedily removed. This also applies to a case where the hood is erroneously lifted for some reason.

Further, the hood lifting and retaining mechanism of the above vehicle hood apparatus has a hook mounted to the rod or the vehicle body, being biased by a compression spring, which hook engages with the vehicle body to prevent the rod lifted a predetermined amount from descending, thereby retaining the hood in the lifted position.

As described above, the conventional hood apparatus retains the hood in the lifted position, and therefore has a complicated hooking mechanism consisting of the hook and the compression spring incorporated in the vehicle body. To incorporate such a hooking mechanism in the rod, the hood lifting and retaining mechanism becomes complicated and larger in its entirety, not being a smart solution. Further, to incorporate the hooking mechanism in the vehicle body, careful consideration is required for reliable hooking of the rod moving upward a predetermined amount at significantly high speed.

SUMMARY OF THE INVENTION

It is an object of the present invention to provide a vehicle hood apparatus of simple construction which can securely retain a hood in a lifted position.

It is another object of the present invention to provide a vehicle hood apparatus which can remove obstruction to the driving vision of a driver caused by a hood lifted upon collision between the vehicle and an object to be protected.

According to the present invention, there is provided a vehicle hood apparatus comprising: a hood for covering an engine room positioned in the front portion of a vehicle; a lifting actuator for lifting the rear end of the hood a predetermined amount when the vehicle collides with an object to be protected; and a hood retaining mechanism for retaining the hood in the lifted position; the hood retaining mechanism comprising: a bracket mounted to a body frame; a lower link swingably mounted to the bracket; an upper link swingably mounted to the rear end of the hood; a hinge for bendably and stretchably mounting the lower link and the upper link such that the hinge is offset forward relative to the vehicle; a stopper provided between the lower link and the bracket for preventing the lower link from falling rearward relative to the vehicle subsequent to the stretching of the lower link and the upper link; and a ratchet mechanism provided between the lower link and the bracket for allowing the lower link and the upper link to shift from a bending state to a stretching state while preventing the reverse shift.

Thus in the present invention, the lifting actuator is activated to lift the hood a predetermined amount, the lower link and the upper link stretch from the bending state. The stopper prevents the lower link from falling rearward relative to the vehicle. The ratchet mechanism blocks the lower link and the upper link from shifting from a stretching state to a bending state.

Thus the hood lifted is securely retained by the hood retaining mechanism.

The retaining mechanism eliminates the need for providing a lifting actuator as the hood lifting means with additional means for retaining the lifted hood, enabling the hood lifting means to be of a simplified structure.

The bracket is configured to buckle and deform when a downward load exceeding a predetermined amount acts thereon. For example, according to an embodiment of the present invention, a wall of the bracket is formed with a section C-shaped part. Specifically, when the bracket receives a downward load over a predetermined amount, the section C-shaped part buckles and deforms, thereby absorbing the force. Thus the impact on the object to be protected can be sufficiently mitigated.

The prevent invention is further provided with a pulling actuator for pulling the ratchet pawl of the ratchet mechanism in a disengaging direction. Upon the collision of the vehicle with the object to be protected or some other object, the hood is lifted. After the lapse of a predetermined period of time since the hood was lifted, it is determined that no secondary collision will occur between the object and the top surface of the hood. Then the ratchet mechanism is disengaged with the pulling actuator to return the hood to the original closing position. Alternately, after the hood is lifted upon the collision between the vehicle and the object to be protected, the pulling actuator is activated at will to disengage the ratchet mechanism, thereby returning the hood to the original position. Thus the obstruction of the driving vision of the driver caused by the lifted hood is speedily removed.

BRIEF DESCRIPTION OF THE DRAWINGS

Certain preferred embodiments of the present invention will be described below, by way of example only, with reference to the accompanying drawings, in which.

DETAILED DESCRIPTION OF THE PREFERRED EMBODIMENTS

Figure 1:
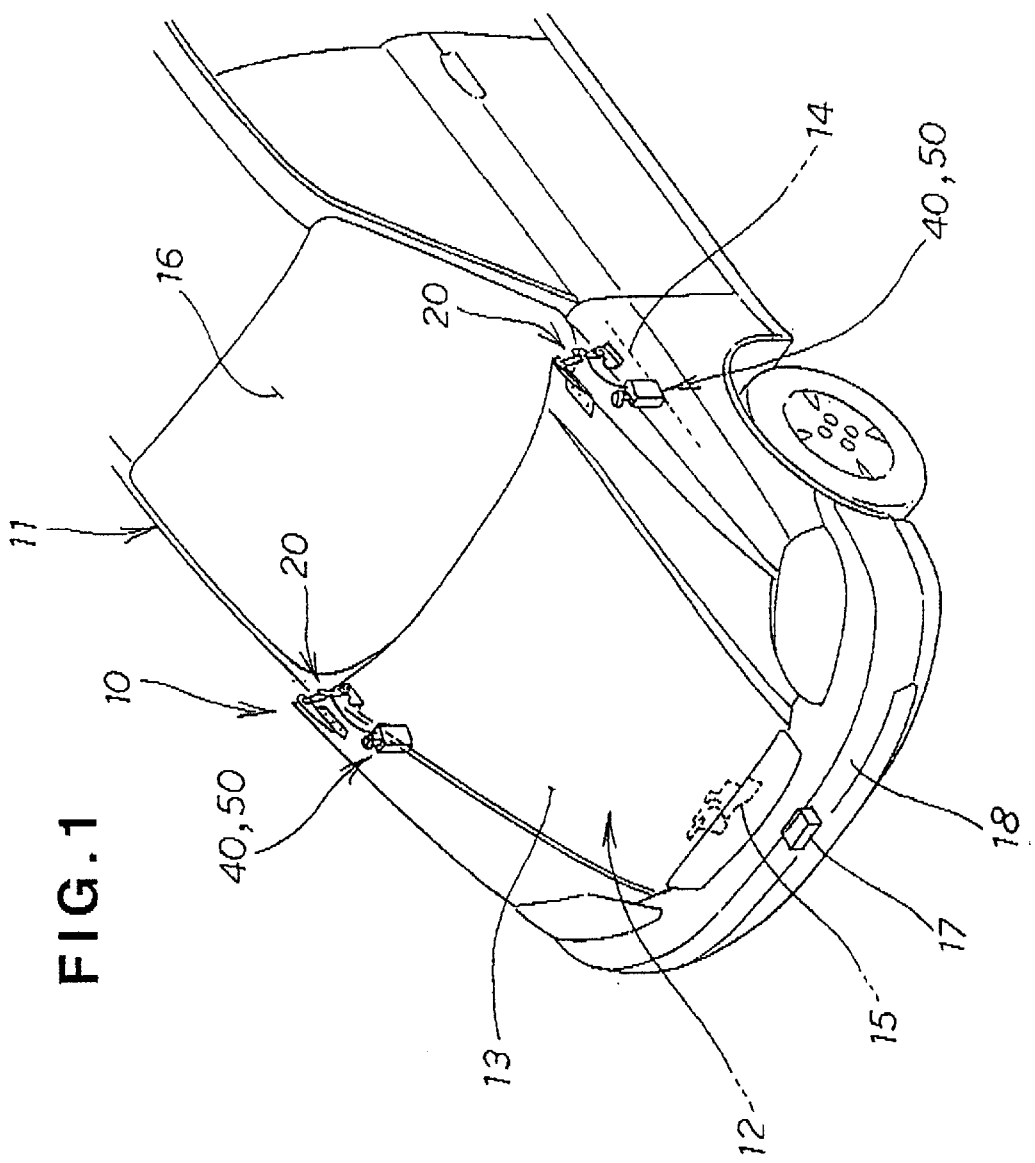
FIG. 1 is a perspective view of part of a vehicle equipped with a vehicle hood apparatus according to the present invention.
Figure 2:
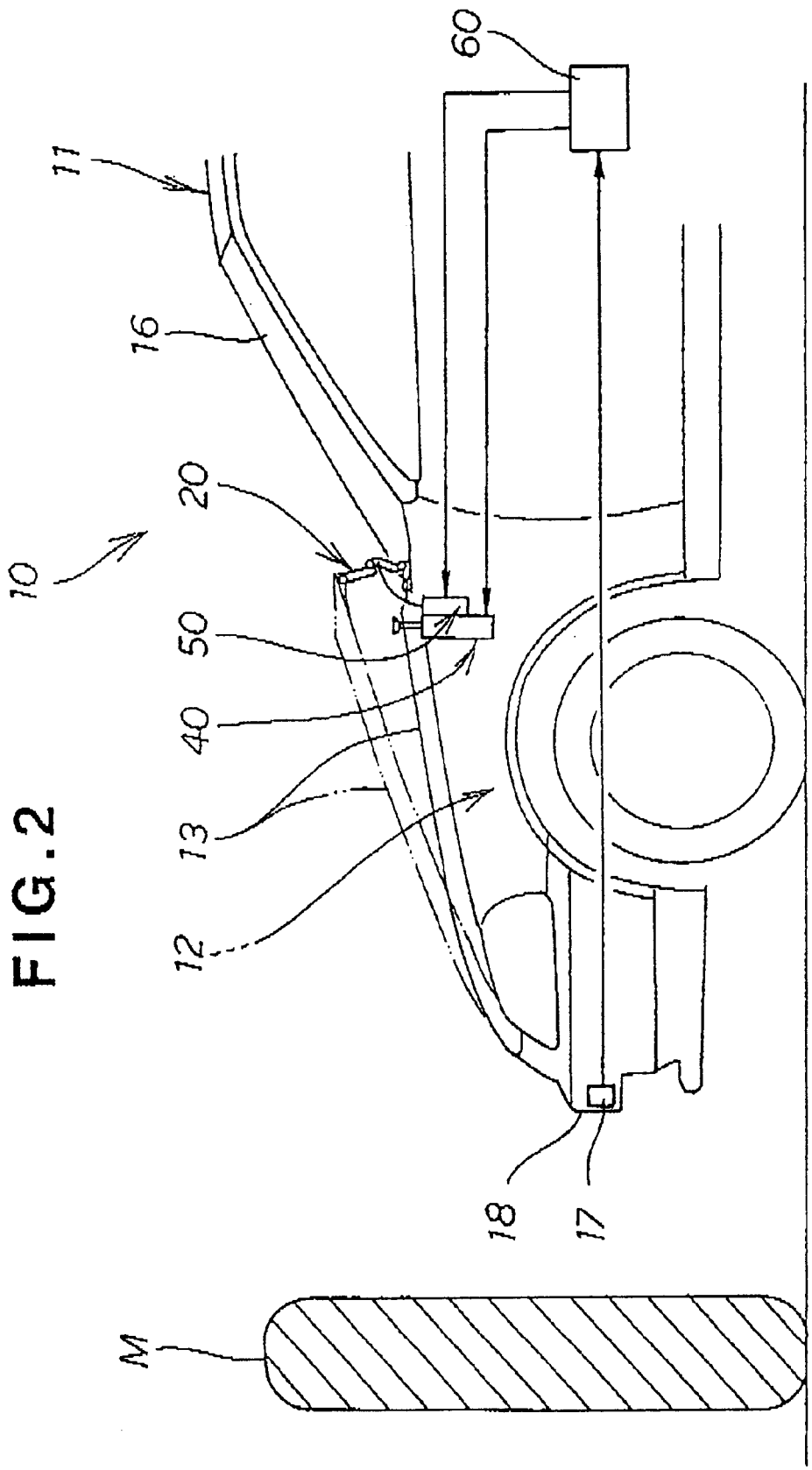
FIG. 2 is a side view of the vehicle shown in FIG. 1.

Referring to FIGS. 1 and 2, a vehicle 11 equipped with a vehicle hood apparatus 10 according to the present invention as a hood 13 which covers the upper opening of an engine room 12 provided at the front part thereof. A pair of hood retaining mechanisms 20, 20 are interposed between the rear end of the hood 13 and the body frame 14 on the right and left sides with respect to the forward direction of the vehicle 11, to allow the opening and closing of the rear end of the hood 13. The front end of the hood 13 is adapted to be locked to the body frame 14 by a hood lock.

The hood apparatus 10 has a bumper sensor 17 for outputting a collision detection signal when the vehicle 11 collides with an object M to be protected in front thereof, the right and left hood retaining mechanisms 20, 20, right and left lifting actuators 40 for lifting the rear end of the hood 13 upward, right and left pulling actuators 50 for returning the rear end of the hood 13 lifted to the original position, and a control unit 60 for controlling the activation of the lifting actuators 40 and the pulling actuators 50 in response to a signal from the bumper sensor 17.

The bumper sensor 17 is, for example, an acceleration sensor mounted to a front bumper 18 of the vehicle 11. The control unit 60 is constituted with a microcomputer, for example, as a main component. In the figures, reference numeral 16 denotes a windshield.

Figure 3:
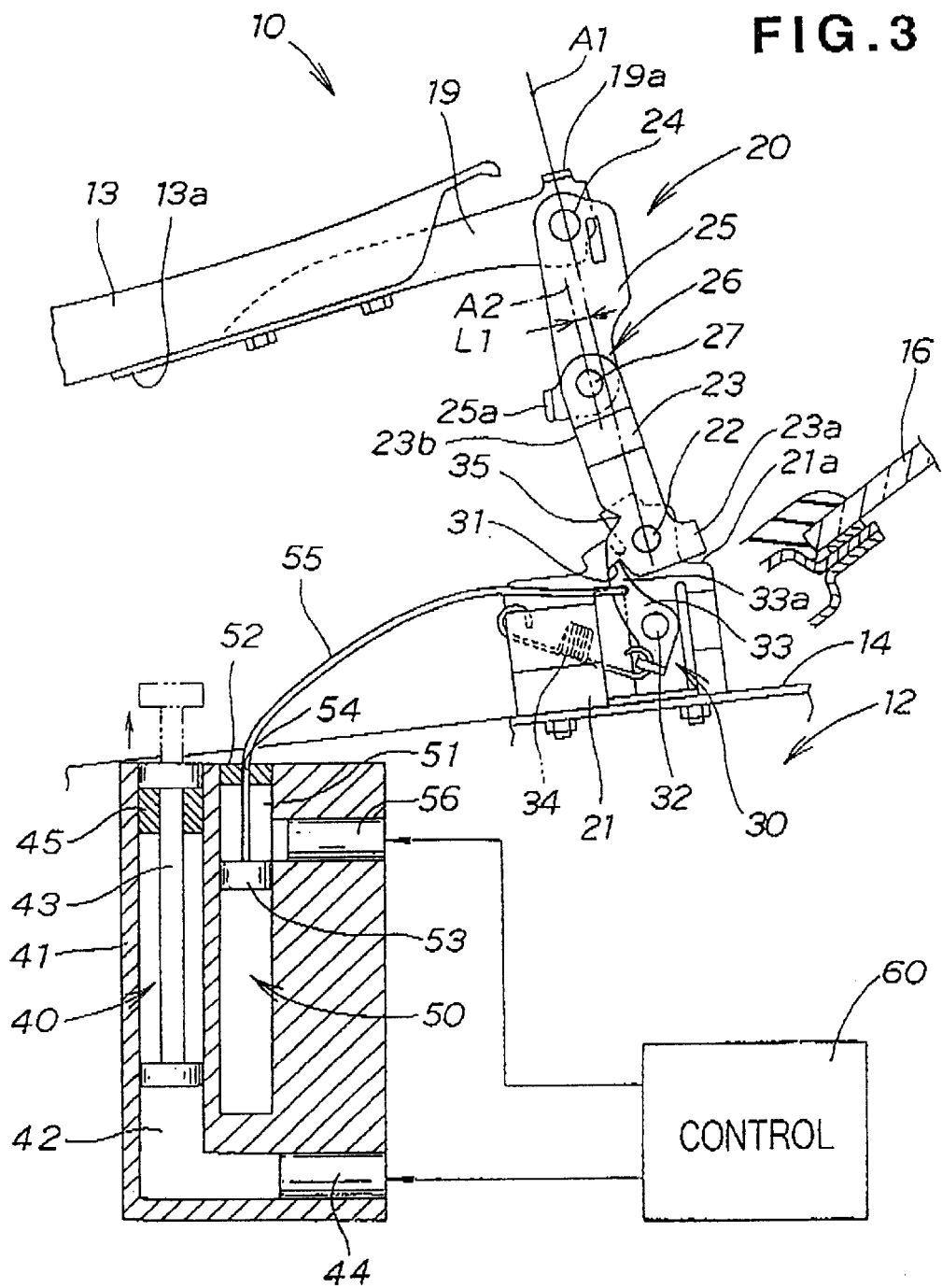
FIG. 3 shows details of the vehicle hood apparatus according to the present invention.

FIG. 3 shows details of the vehicle hood apparatus according to the present invention as shown in FIGS. 1 and 2, with the rear end of the hood 13 lifted.

The hood retaining mechanism 20 is a hinge mechanism for retaining the rear end of the hood 13 in a manner that allows the up and down motion of the hood 13. The hood retaining mechanism 20 is a linkage including a bracket 21 bolted to the body frame 14, a lower link 23 mounted via a first pin 22 to the bracket 21 swingably in the longitudinal direction of the vehicle, an upper link 25 mounted via a second pin 24 to the rear end of the hood 13 swingably in the longitudinal direction of the vehicle, and a hinge 26 for rotatably connecting the lower link 23 and the upper link 25.

The hood 13 has an arm 19 extending rearward from the rear thereof. The rear end of the arm 19 and the upper link 25 are rotatably connected through the second pin 24. The arm 19 has an opening restriction stopper 19a for restricting the full opening of the hood 13 integrally formed in its rear upper part. The hinge 26 includes a third pin 27 for rotatably connecting the lower link 23 and the upper link 25.

When lifting the rear end of the hood 13, the hinge 26 of the hood retaining mechanism 20 of such a structure is offset by distance L1 forward relative to the vehicle. More specifically, with respect to line A1 passing through the center of the first pin 22 and the center of the second pin 24, center line A2 of the third pin 27 is offset by distance L1 forward relative to the vehicle. The hood retaining mechanism 20 with the hinge 26 offset as described above constitutes a flex link mechanism being able to stretch and bend in accordance with the up and down motion of the hood 13.

The hood retaining mechanism 20 has a lower stopper 23a provided in the lower part of the lower link 23 for preventing the lower link 23 from swinging rearward relative to the vehicle when the lower link 23 and the upper link 25 stretch. The lower stopper 23a removably engages with the bracket 21. A ratchet mechanism 30 is provided between the lower link 23 and the bracket 21 for allowing the lower link 23 and the upper link 25 to shift from the bending state to the stretching state while preventing the reverse shift.

The lower stopper 23a is formed at the lower part of the lower link 23 to abut against an upper end 21a of the bracket 21, thereby preventing the lower link 23 from swinging further rearward relative to the vehicle.

The upper link 25 has an upper stopper 25a formed at a lower front end thereof. The upper stopper 25a abuts against an upper front part 23b of the lower link 23 to prevent the upper link 25 from tiling further frontward.

The ratchet mechanism 30 consists of a ratchet recess 31 formed at a front lower part of the lower link 23, a ratchet pawl 33 mounted to the bracket 21 swingably on a ratchet pin 32 back and front, and a pulling spring 34 for biasing a pawl 33a of the ratchet pawl 33 to the ratchet recess 31. The pulling spring 34 is interposed between the bracket 21 and the ratchet pawl 33. The lower link 23 has a pawl receiving recess 35 formed at a front part thereof.

A lifting actuator 40 and a pulling actuator 50 are accommodated in a single housing 41. The housing 41 is mounted to the body frame 14.

The lifting actuator 40 consists of a cylinder 42 with an opening at the upper end of the housing 41, a piston 43 reciprocally movable in the cylinder 42, a lifting inflator 44 and a stopper 45.

The pulling actuator 50 pulls the ratchet pawl 33 of the ratchet mechanism 30 in the disengaging direction. The pulling actuator 50 consists of a cylinder 51 with an opening at the upper end of the housing 41, a seal 52 for sealing the upper end of the cylinder 51, a piston 53 reciprocally movable in the cylinder 51, a pulling wire (pulling member) 55 extending outward through a hole 54 of the seal 52 of the cylinder 51, and a pulling inflator 56. One end of the pulling wire 55 extending outward of the seal 52 is connected to the ratchet pawl 33. As described above, the hood retaining mechanism 20 has the lifting actuator 40 and the pulling actuator 50.

When receiving control signals from the control unit 60, each of the lifting inflator 44 and the pulling inflator 56 ignites a gas producing agent with an ignition device not shown to produce a large amount of gas, and floods the cylinder 42 or 51 with the gas. The flooding gas temporarily raises pressure in the cylinders 42, 51. As a result, the lifting piston 43 moves upward and the pulling piston 53 moves downward. The cylinders 42, 51 are provided with orifices of a small diameter (not shown) to reduce the internal pressure after a short lapse of time.

In the lifting actuator 40, when the lifting inflator 44 receives a control signal (lifting signal ON), the cylinder 42 is temporarily pressurized, so that the piston 43 moves upward by a predetermined stroke. Thereafter the piston 43 moves downward to the original position in proportion to the decreasing pressure in the cylinder 42.

In the pulling actuator 50, when the pulling inflator 56 receives a control signal (pulling signal ON), the pressure in the cylinder 51 is temporarily raised to move the piston 53 downward by a predetermined stroke. The pulling wire 55 pulled by the downward motion of the piston 53 pulls up the ratchet pawl 33, causing it to swing frontward.

Figure 4:
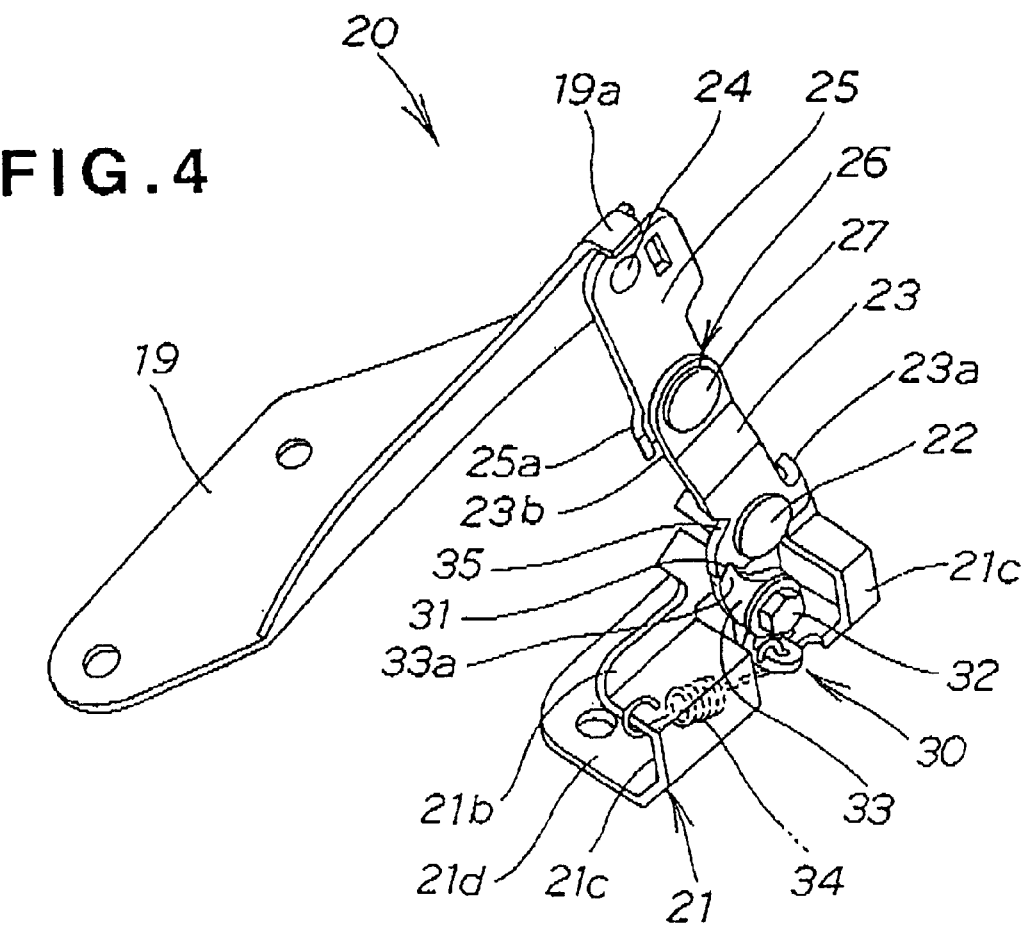
FIG. 4 is a perspective view taken from one side showing hood retaining mechanism as shown in FIG. 3.

FIG. 4 is a perspective view showing the hood retaining mechanism from one side.

The bracket 21 has a wall 21b to which the lower link 23 is mounted, which wall is formed with a section C-shaped part 21c, being thereby able to buckle easily when a large downward load acts thereon. More specifically, the bracket 21 is a product integrally molded from a plate, consisting of the upright wall 21b, the section C-shaped part 21c formed by bending at the lower end of the wall 21b, and a base 21d extending horizontally from the section C-shaped part 21c.

Figure 5:
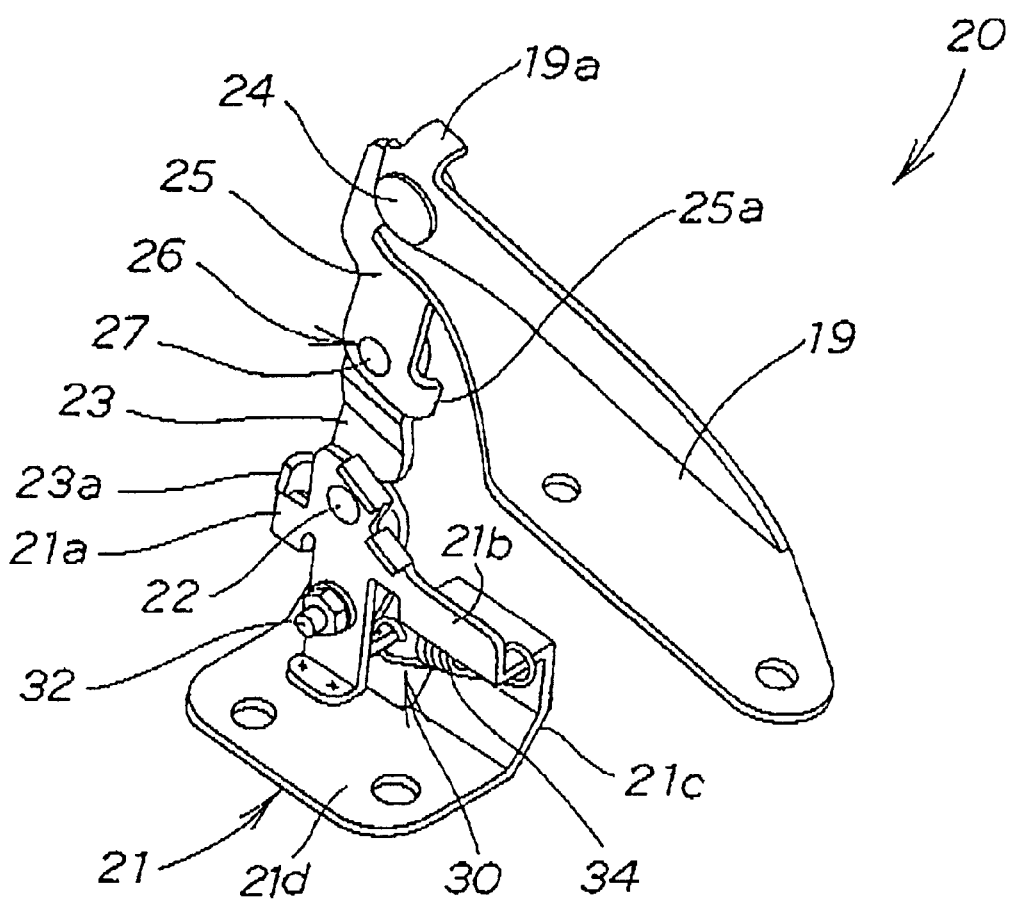
FIG. 5 is a perspective view taken from the other side showing the hood retaining mechanism as shown in FIG. 3.

FIG. 5 is a perspective view showing the hood retaining mechanism 20 as shown in FIG. 4 from the other side.

The hood opening restriction stopper 19a is a projection formed by bending a part of the arm 19 in a hook shape. The lower stopper 23a is a projection formed by bending a part of the lower link 23 in a hook shape. The upper stopper 25a is a projection formed by bending a part of the upper link 25 in a hook shape. The ratchet pin 32 consists of a nut and bolt.

Figure 6:
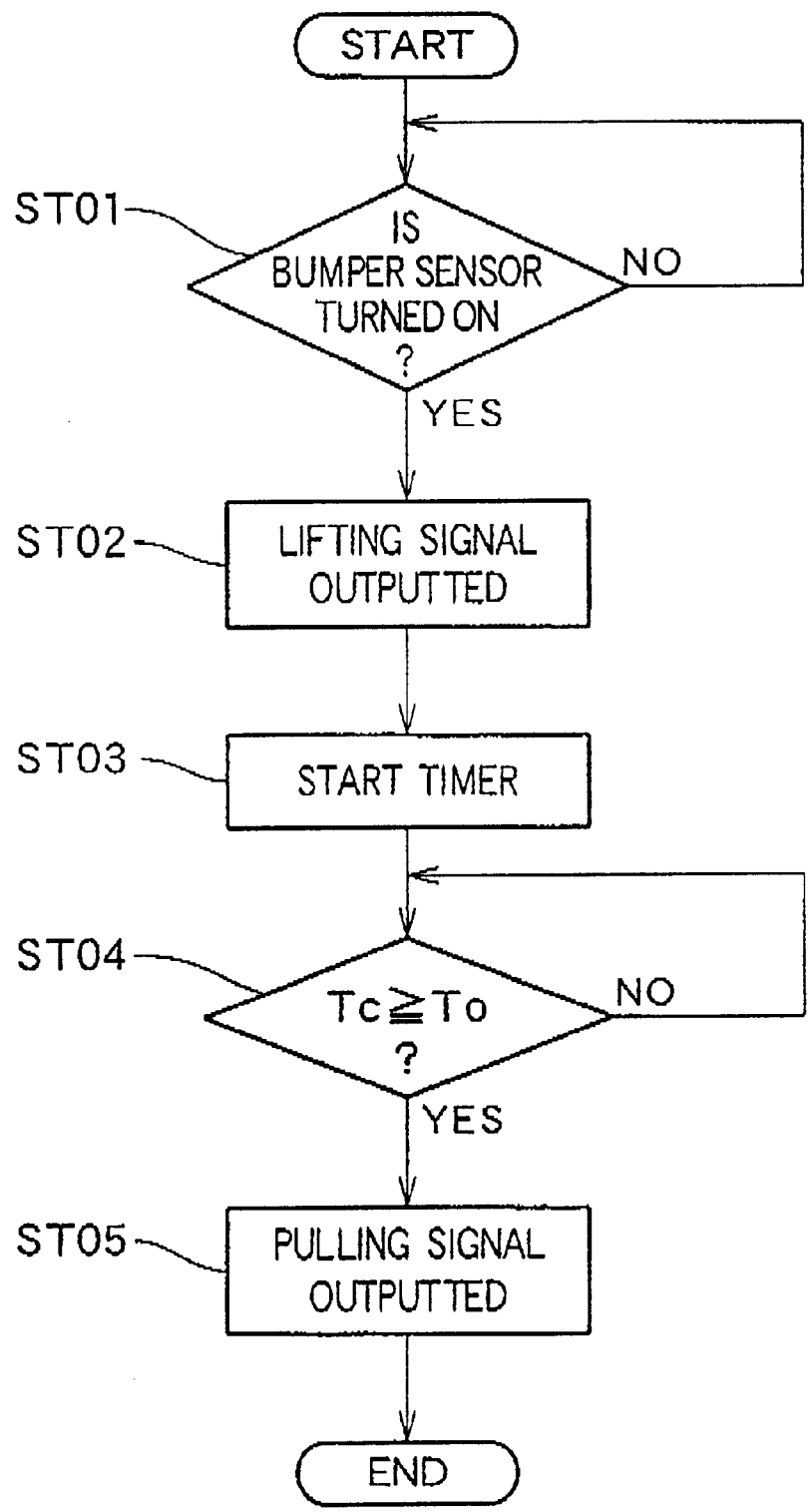
FIG. 6 is a control flow chart of a control unit as shown in FIG. 2.

Now the operation of the control unit 60 will be described with reference to FIG. 2 and a flow chart as shown in FIG. 6.

STEP (hereinafter referred to as ST) 01: Determine whether the bumper sensor 17 as shown in FIG. 2 is ON, that is, whether a detection signal from the bumper sensor 17 is received or not. If YES, proceed to ST02. If NO, return to ST 01. If YES in ST 01, it is determined that the vehicle 11 has collided with an object M to be protected.

ST02: A lifting signal is outputted to activate the lifting actuator 40 to thereby lift the hood.

ST03: Activate a timer.

ST04: Determine whether counted time Tc of the timer exceed reference time To (0.1 to 0.5 sec, for example). If YES, proceed to ST05. If NO, repeat ST04.

ST05: A pulling signal is outputted to activate the pulling actuator 50 to return the hood to its original position and complete the control.

ST03 and ST04 serve as a timer for counting a redetermined time period from the time when the hood 13 is lifted. Thus the control unit 60 includes the timer.

Now the function of the hood retaining mechanism 20 of the above-described structure will be described with reference to FIGS. 7 to 13.

Figure 7:
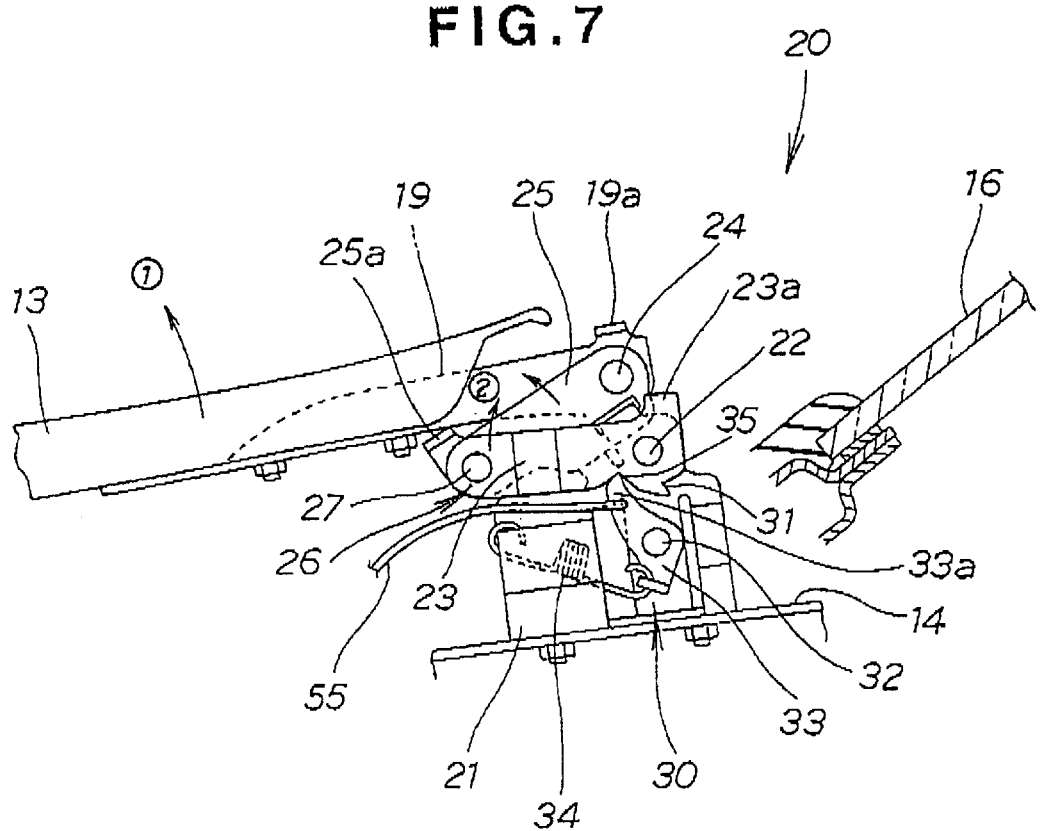
FIGS. 7 to 13 are functional diagrams showing the motion of the hood retaining mechanism as shown in FIG. 3.

FIG. 7 shows a normal state where the rear end of the hood 13 is lowered to close over the engine room. In this state, the hood retaining mechanism 20 folds with the hinge 26 largely offset forward relative to the vehicle to have an acute V shape. The pawl 33a of the ratchet pawl 33 engages with the pawl receiving recess 35 of the lower link 23. When the rear end of the hood 13 is lifted (in the direction of arrow) with the front end of the hood 13 locked to the body frame, the upper link 25 is lifted, swinging on the third pin 27 and the lower link 23 is lifted, swinging on the first pin 22 (in the directions of arrows).

Figure 8:
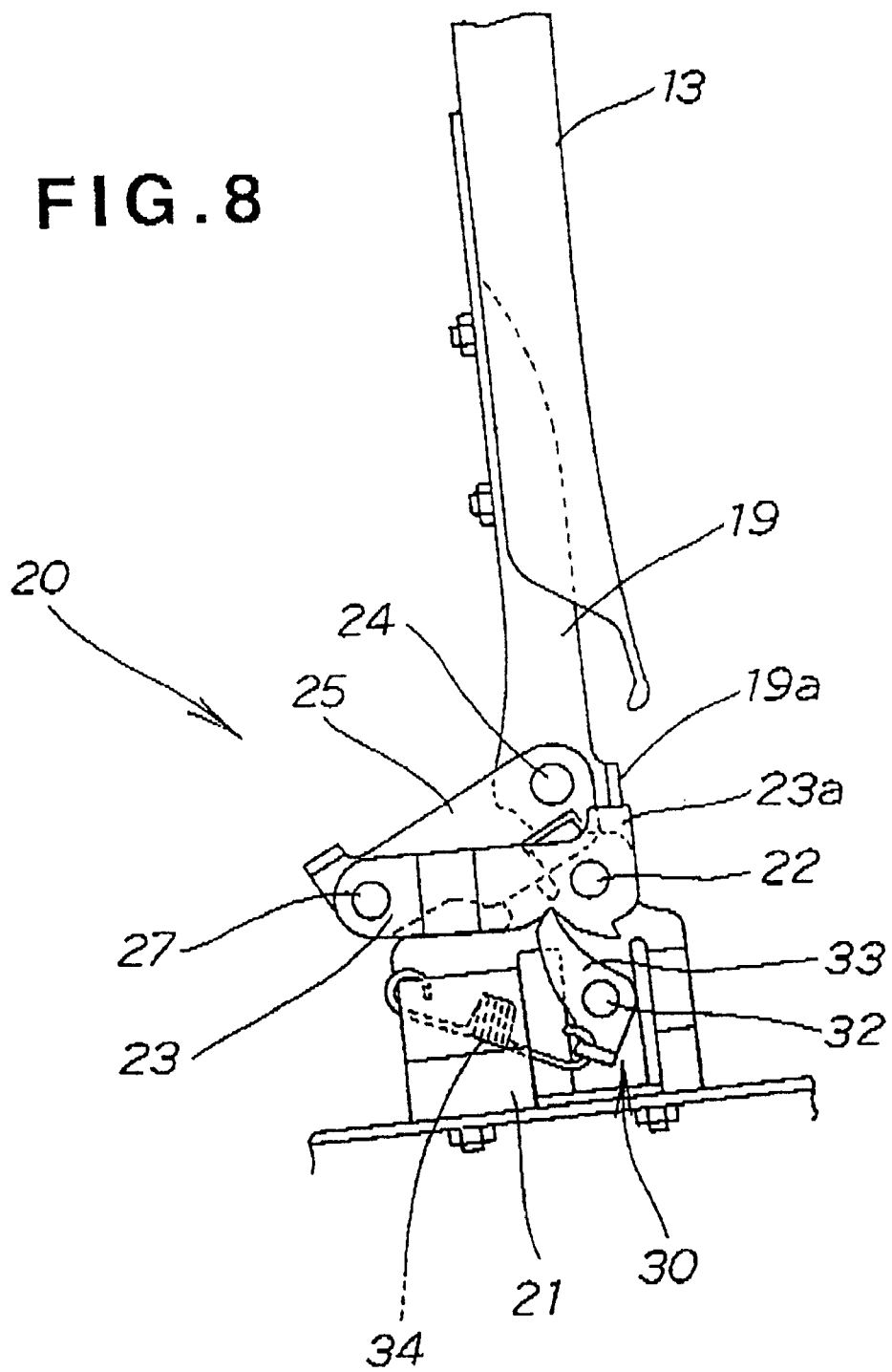

FIG. 8 shows the state where the hood 13 is fully opened. The hood retaining mechanism 20 folds and the hood 13 is opened and closed on the second pin 24. When the hood is fully opened, the hood opening restriction stopper 19a abuts against the lower stopper 23a of the lower link 23. As a result, the degree of full opening of the hood 13 is restricted.

Figure 9:
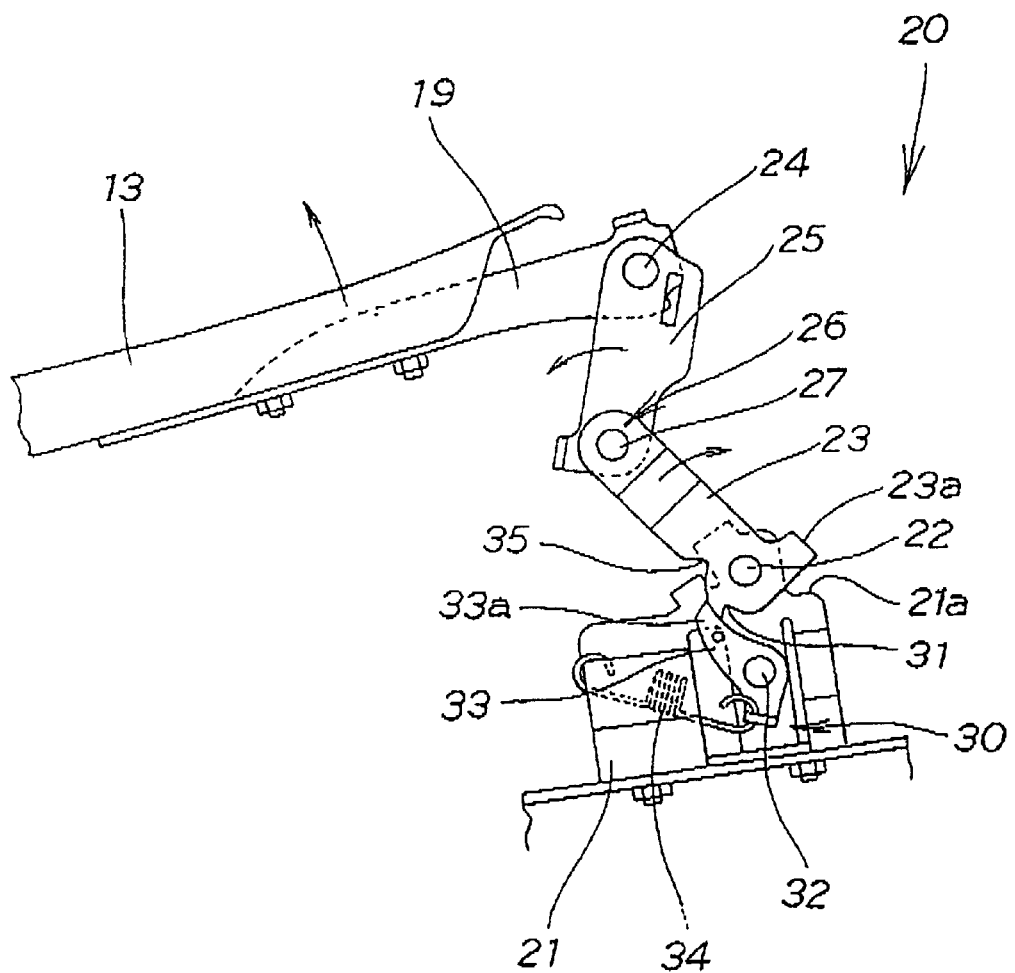

FIG. 9 shows a state where the rear end of the hood 13 is lifted from the position as shown in FIG. 7.

In commensurate with the lifted amount of the hood 13, the lower link 23 and the upper link 25 swing to increase the opening angle of the link being bent in a V shape. The pawl 33a of the ratchet pawl 33 disengages from the pawl receiving recess 35.

Figure 10A:
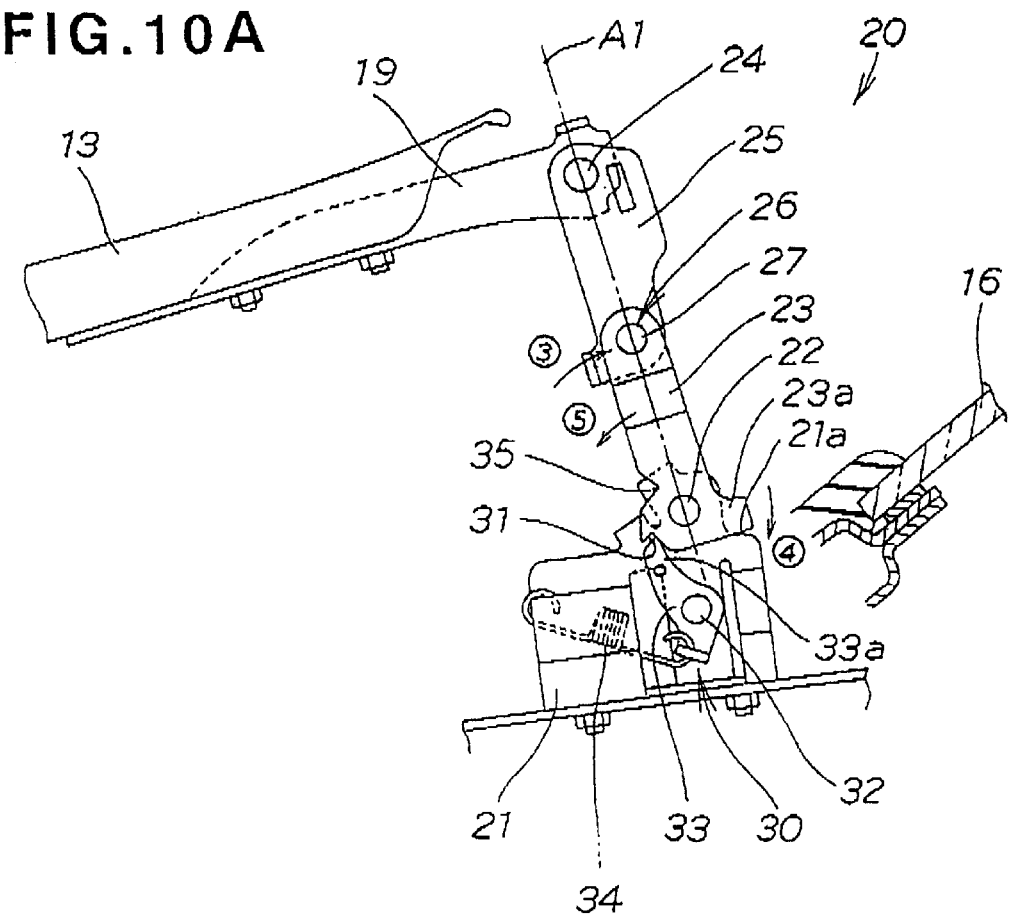
Figure 10B:
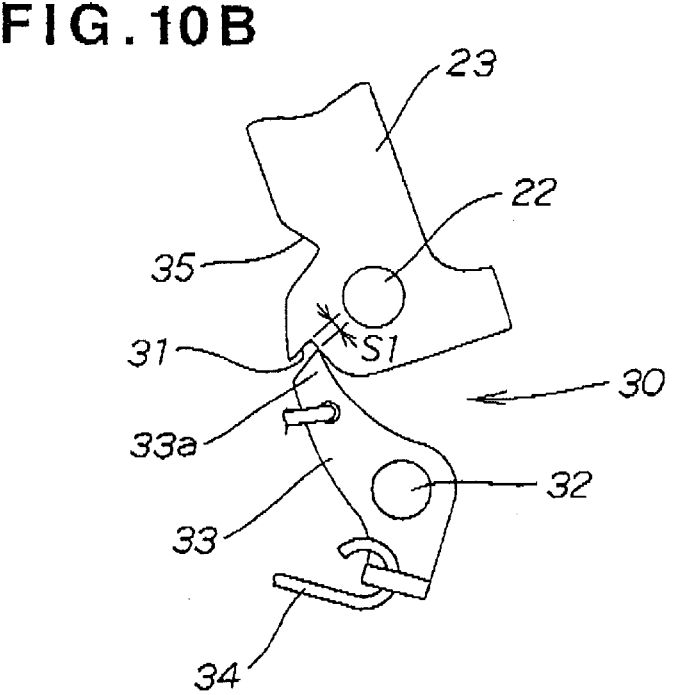

FIG. 10A shows a state where the rear end of the hood 13 is lifted to the maximum extent. FIG. 10B shows the relationship between the ratchet pawl 33 and the lower link 23 in this state.

As shown in FIG. 10A, the inertia produced by lifting the rear end of the hood 13 with momentum moves the third pin 27 to a point on line A1 passing through the center of the first pin 22 and the center of the second pin 24 (in the direction of arrow), so that the first to third pins 22, 24 and 27 are aligned on line A1. At that time, the pawl 33a of the ratchet pawl 33 engages with the ratchet recess 31. However, as shown in FIG. 10B, a space S1 is produced between the ratchet recess 31 an the pawl 33a.

With the rear end of the hood 13 lifted due to momentum, the lower stopper 23a of the lower link 23 abuts against the upper end 21a of the bracket 21a with great force (in the direction of arrow). In reaction to the motion, the lower link 23 is rotated forward in reverse (in the direction of arrow).

Figure 11:
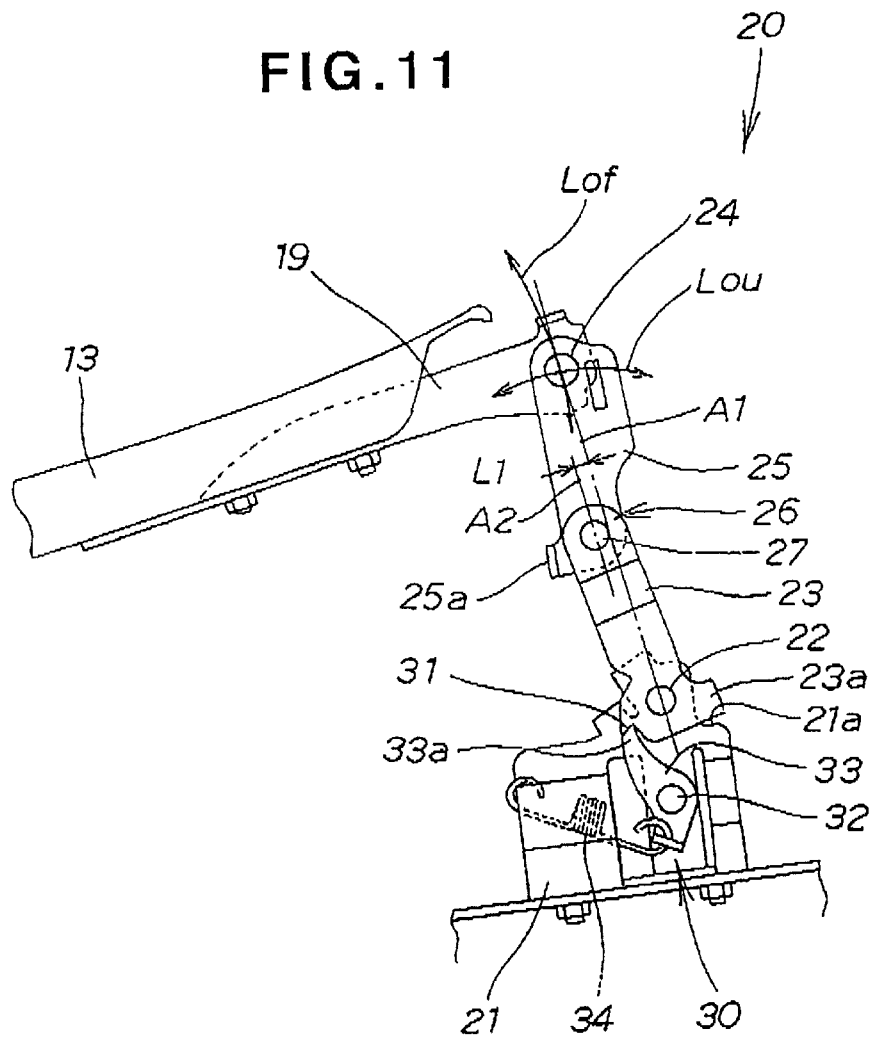

The reverse forward rotation of the lower link 23 results in no space S1 (See FIG. 10) being left between the ratchet recess 31 and the pawl 33a as shown in FIG. 11. The lower link 23 and the upper link 25 of the hood retaining mechanism 20 stop swinging in a slightly bending state with the hinge 26 offset by distance L1 forward relative to the vehicle from line A1. At that time, the weight of the hood 13 is applied to the second pin 24.

The lower link 23 is prevented from falling backward relative to the vehicle by the lower stopper 23a and the upper end 21a of the bracket 21, and is also prevented from falling forward relative to the vehicle by the ratchet mechanism 30, thereby being prevented from falling both forward and backward.

The front end of the hood 13 is locked by a hood lock 15 as shown in FIG. 1, so that the hood 13 is swingable with the position of the hood lock 15 as a center of swing. Swinging path Lof of the rear end of the arm 19 that swings with the hood 13 is not in agreement with swinging path Lou of the front end of the upper link 25 that swings on the third pin 27, so that the upper link 25 cannot swing in this state. The lower and upper links 23, 25 are not bendable, so that the rear end of the hood 13 is not lowered from the lifted position.

Thus when the hood 13 is lifted a predetermined amount by stretching the lower link 23 and the upper link 25, the lower stopper 23a prevents the lower link 23 from falling backward relative to the vehicle, and the ratchet mechanism 30 prevents the lower and upper links 23, 25 from shifting from a stretched state to a bent state. As a result, the rear end of the hood 13 is retained in the predetermined-amount lifted position.

As is apparent from the above description, the rear end of the hood 13 can be securely retained at a predetermined position to which it is lifted by the hood retaining mechanism 20 made by linkage of simple structures. This eliminates the need for providing the lifting actuator 40 (See FIG. 3) with further mechanism for retaining the hood 13 in the lifted position. Accordingly, the lifting actuator 40 as a means for lifting the hood can be of a simpler structure.

Further, there is no need to connect the lifting actuator 40 to the hood 13 or the hood retaining mechanism. Accordingly, the lifting actuator 40 can be of a much simpler structure.

Figure 12A:
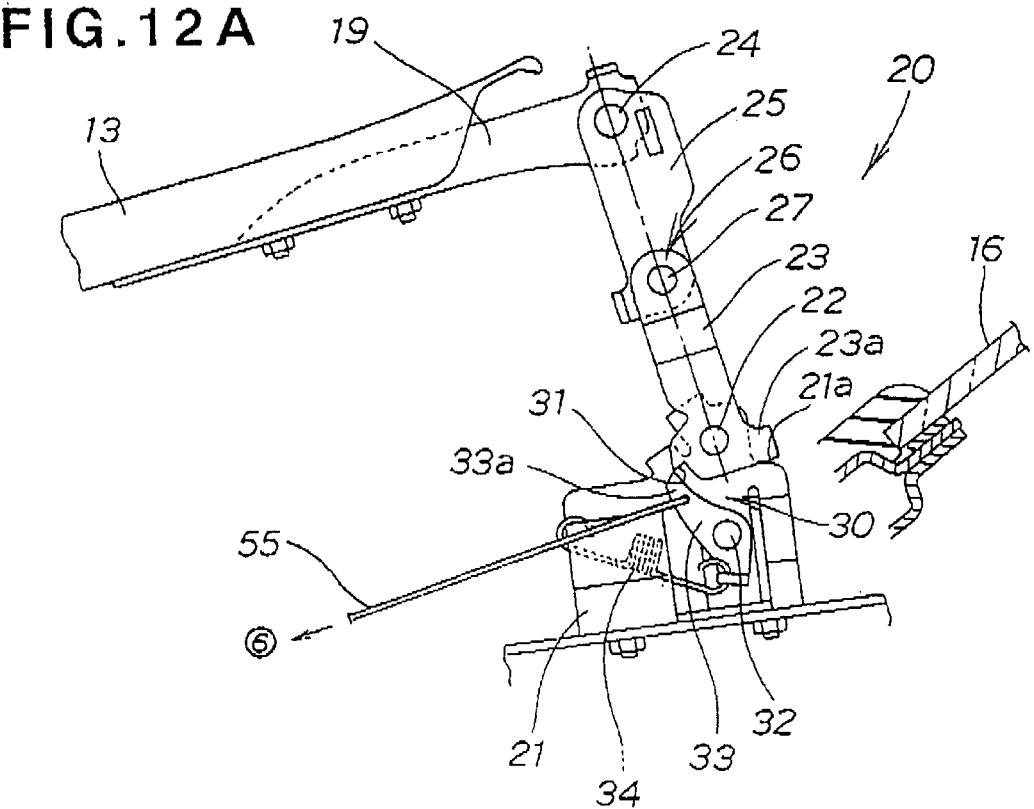
Figure 12B:
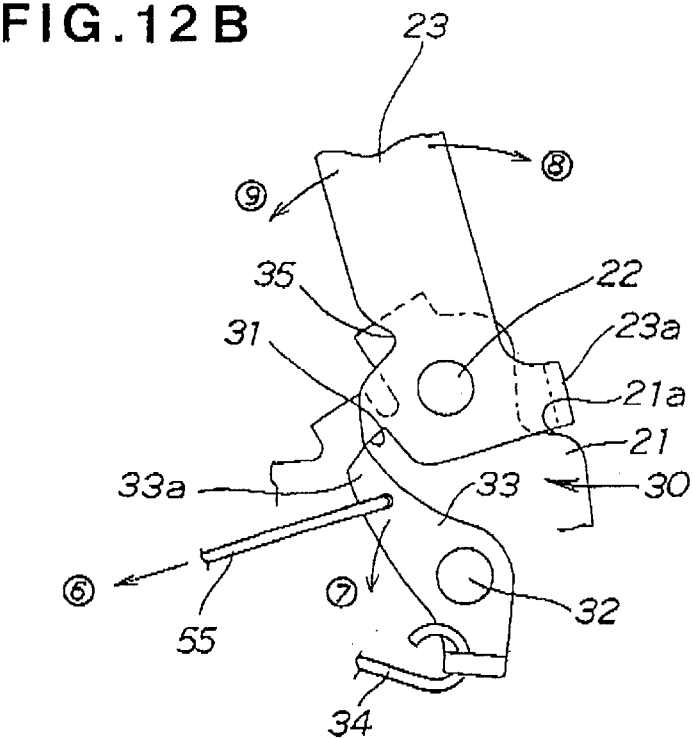

As shown in FIG. 12A, when the pulling wire 55 is pulled up with great strength forward relative to the vehicle (in the direction of arrow), the ratchet pawl 33 swings counter-clockwise on the ratchet pin 32 against the pulling force of the pulling spring 34 (in the direction of arrow). At that time, the pawl 33a kicks the ratchet recess 31 upward and disengages from the ratchet recess 31. As a result, the lower link 23 swings clockwise (in the direction of arrow), the lower stopper 23a of the lower link 23 abuts against the upper end 21a of the bracket 21 with momentum, and in response to the motion, the lower link 23 rotates forward (in the direction of arrow). As a result, the hood retaining mechanism 20 is shifted to the state where it is slightly bent forward, as shown in FIG. 13.

Figure 13:
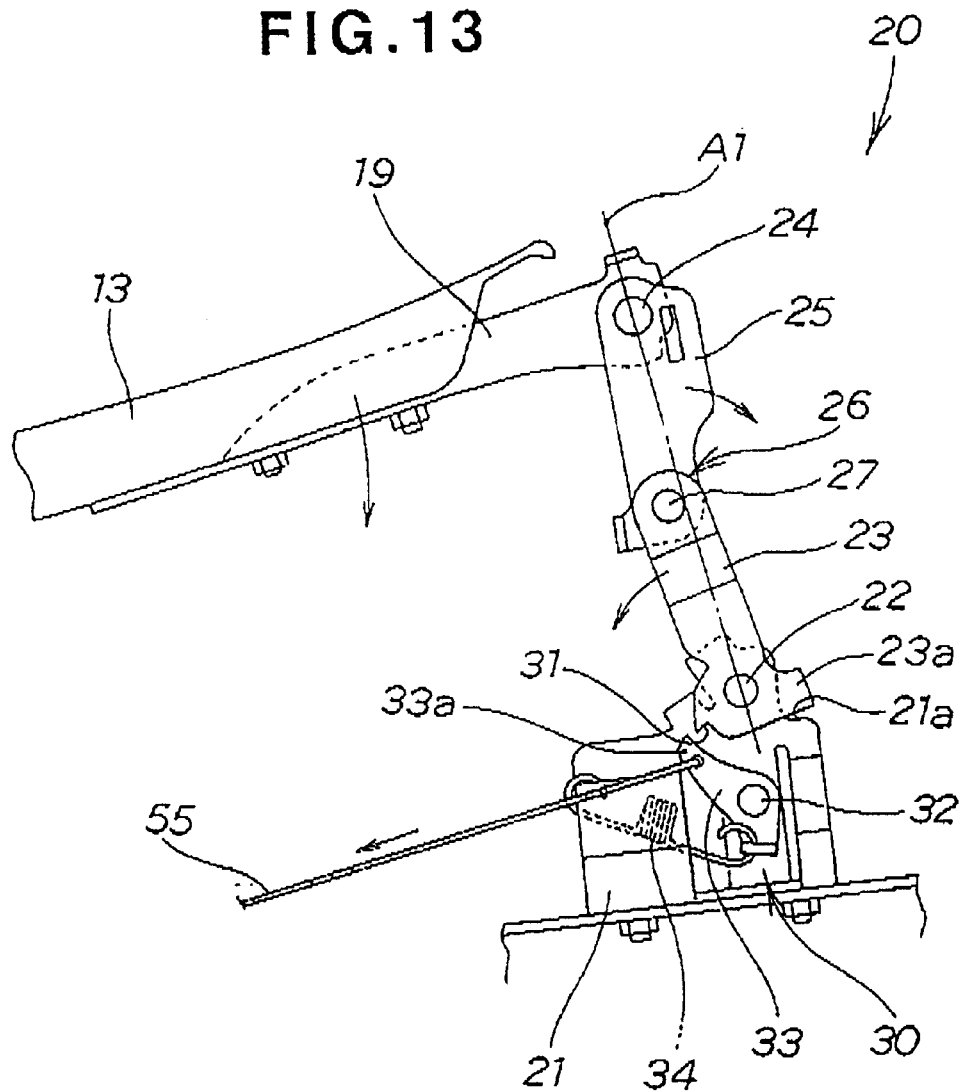

FIG. 13 shows a state where the pawl 33a disengages from the ratchet recess 31.

The second pin 24 is positioned slightly forward of the first pin 22, so that line A1, passing through the centers of the first pin 22 and the second pin 24, tilts slightly forward. When the lower link 23 falls forward with momentum, because of the weight of the hood 13 applying to the second pin 24, the lower link 23 swings forward on the first pin 22 and the upper link 25 swings backward on the third pin 27. As a result, the hood retaining mechanism 20 returns to the original folded state. Accordingly, the hood 13 is lowered and returns to the original position.

Now the function of the hood device 10 will be described with reference to FIGS. 14 to 18.

Figure 14:
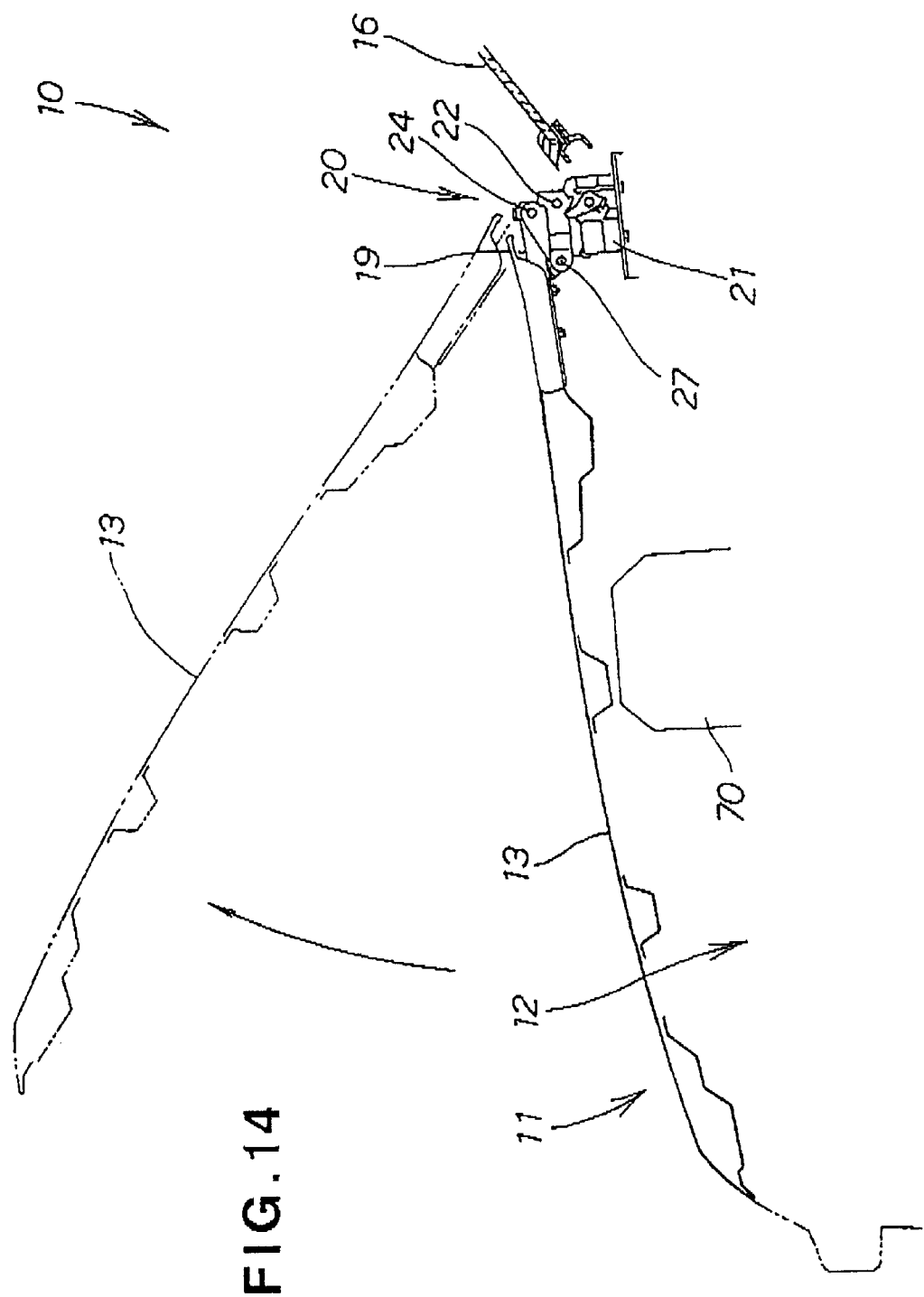
FIGS. 14 to 18 are functional diagrams showing the relationship between a hood and the vehicle hood apparatus according to the present invention.

FIG. 14 shows a normal state where the hood 13 is lowered to close over the engine room 12. At that time, the hood retaining mechanism 20 is in a folding state.

The hood 13 is swingable up and down on the second pin 24. Opening the hood 13 as shown by the phantom line allows the maintenance and inspection of equipment 70 housed in the engine room 12.

Figure 15:
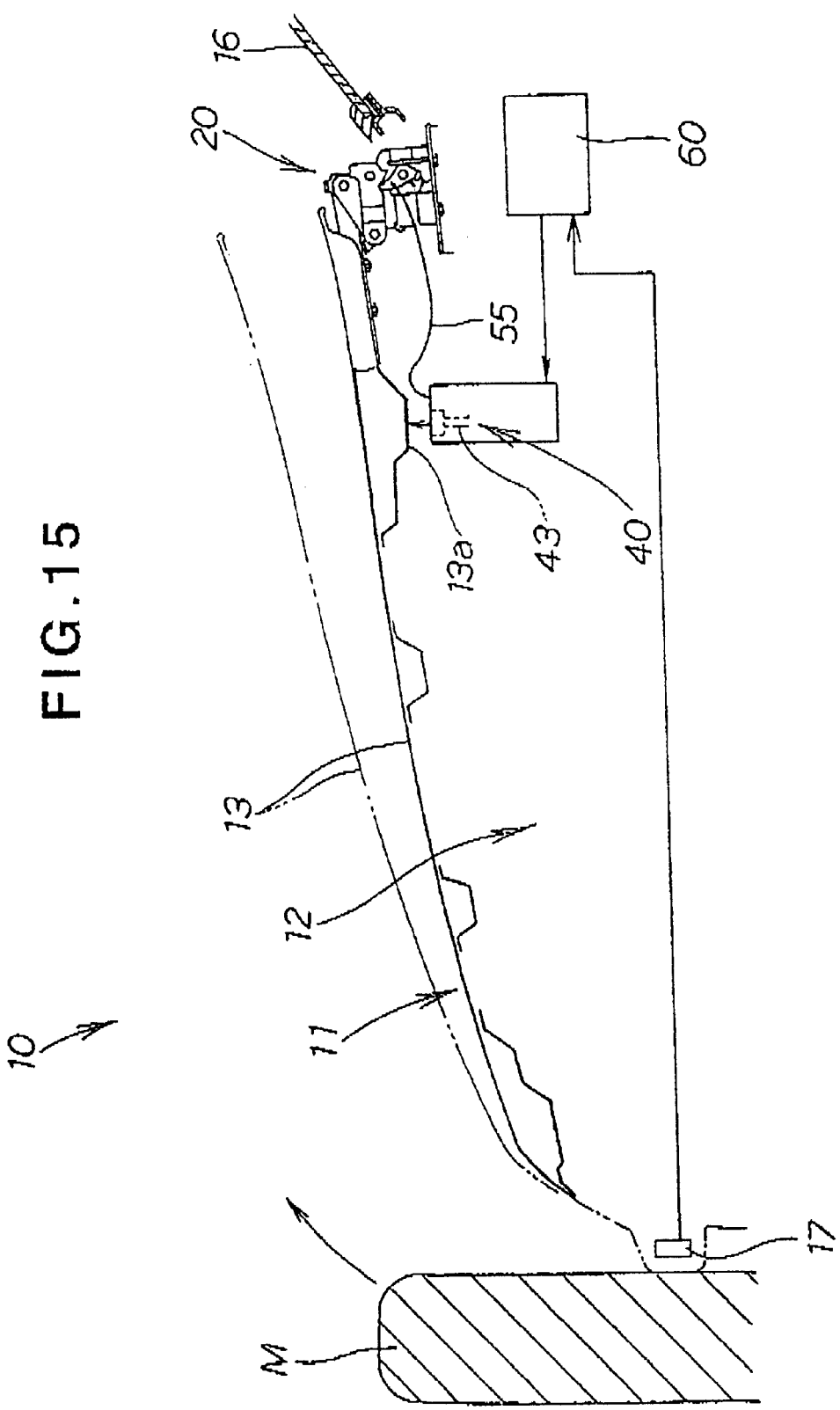

In FIG. 15, when the vehicle 11 collides with an object M to be protected, the lifting actuator 40 receives a lifting signal outputted from the control unit 60. Then the lifting actuator 40 starts the lifting operation and projects a piston 43 upward at high speed, thereby pushing the rear surface 13a of the hood 13 upward.

Figure 16:
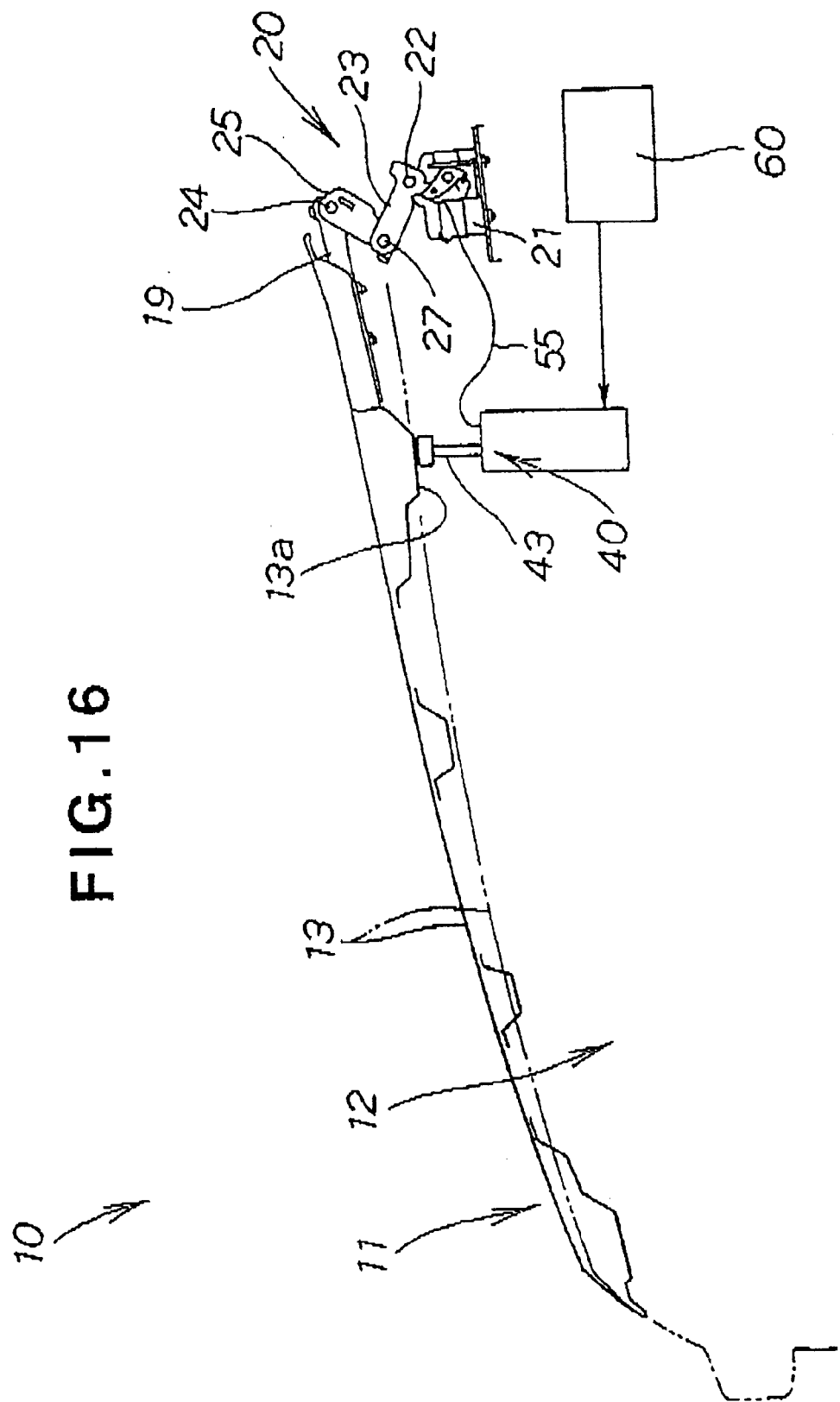

In FIG. 16, with the piston 43 projected to the maximum level at high speed, the hood 13 is pushed up from the level shown by the phantom line to the level shown by the solid line. The hood 13 is further lifted up by the inertia. With the ascent of the hood 13, the hood retaining mechanism 20 expands.

Figure 17:
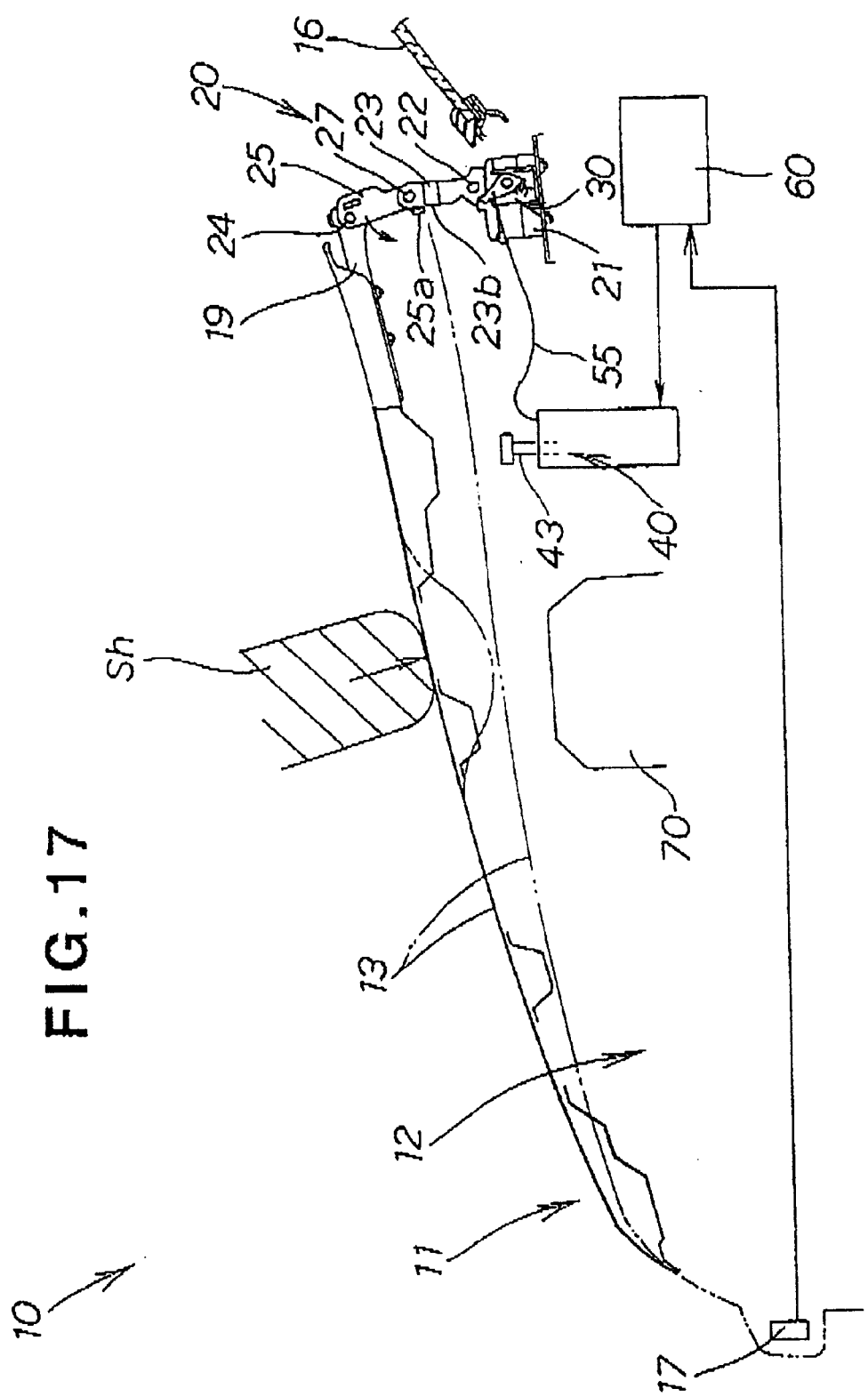

In FIG. 17, the lower link 23 and the upper link 25 of the hood retaining mechanism 20 stop expanding and the rear end of the hood 13 stops lifting. The rear end of the hood 13 is lifted from the original position shown by the phantom line to the position shown by the solid line a predetermined amount (by about 100 to 200 mm, for example). The hood retaining mechanism 20 retains the hood 13 in the lifted position.

A large distance is provided between the hood 13 lifted a predetermined amount and the equipment 70 such as an engine housed in the engine room 12. Thus the hood 13 can deform downward by an increased amount. When a secondary collision occurs between the object M to be protected and the top surface of the hood 13, the hood 13 lifted is deformed as shown by the phantom line to sufficiently absorb the impact of the secondary collision. Thus the equipment 70 is protected from the object M to be protected, and the impact to the object M to be protected is sufficiently mitigated.

However, when the object M to be protected collides with the top surface of the hood 13 in the lifted state and the hood 13 is deformed, a force acts on the second pin 24 to pull it forward. The pulling force causes the upper link 25 to fall forward on the third pin 27. In such a case, however, the upper stopper 25a abuts against the upper front part 23b of the lower link 23, thereby preventing the upper link 25 from tilting further forward. Accordingly, a sufficient distance is secured between the lifted hood 13 and the equipment 70 in the engine room 12.

Figure 18:
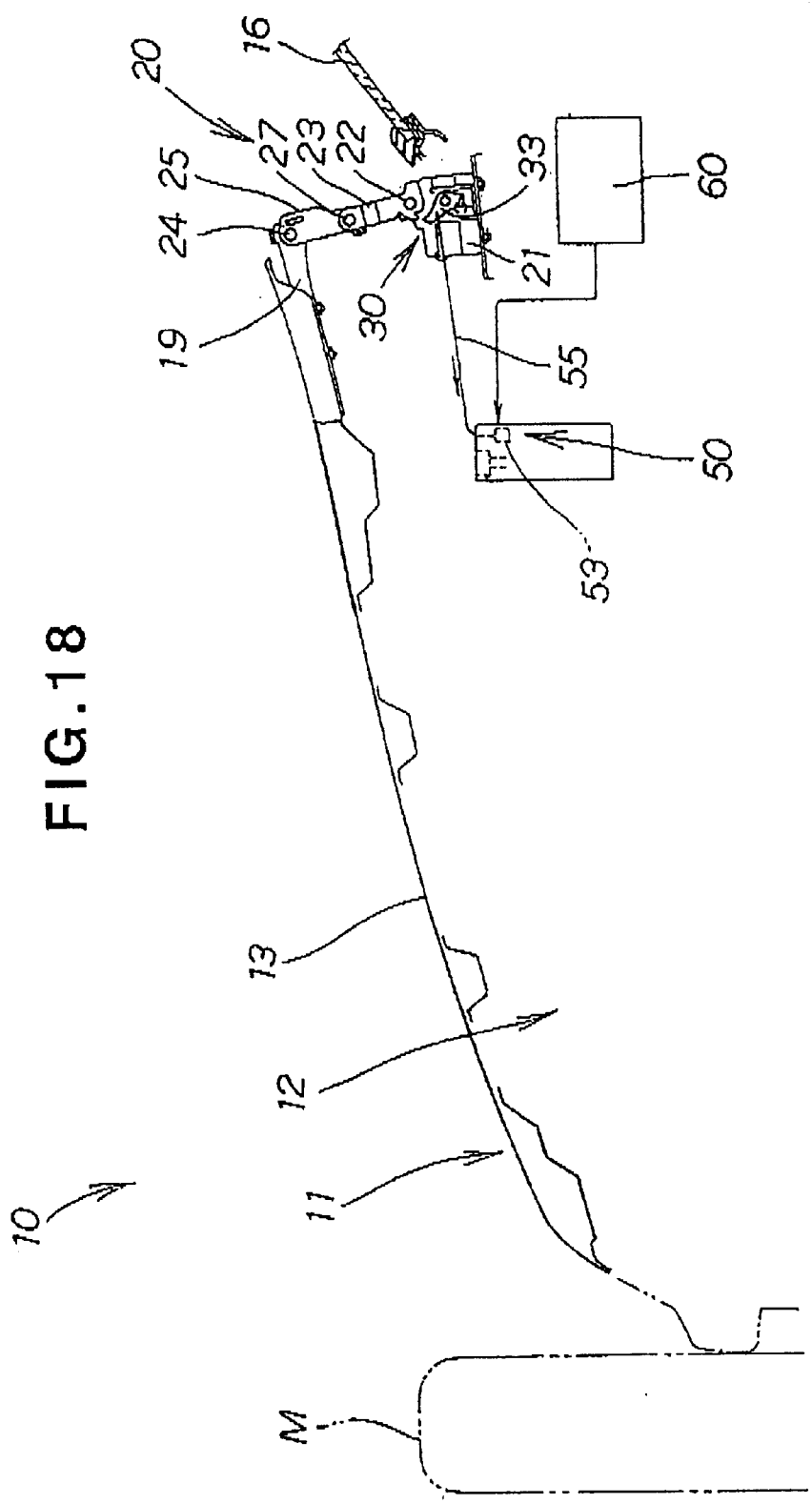

Then, as is shown in FIG. 18, after the vehicle 11 has collided with the object M to be protected and a predetermined time has elapsed since the hood 13 was lifted, the control unit 60 determines that there is no chance that the object M to be protected will have a secondary collision with the top surface of the hood, and supplies a pulling signal to the pulling actuator 50. The pulling actuator 50 starts a pulling operation and pulls the pulling wire 55 at high speed. As a result, the hood retaining mechanism 20 folds and the hood 13 descends and returns to the original closing position. Thus the obstruction of the vision of the driver caused by the hood 13 lifted is speedily removed.

Figure 19A:
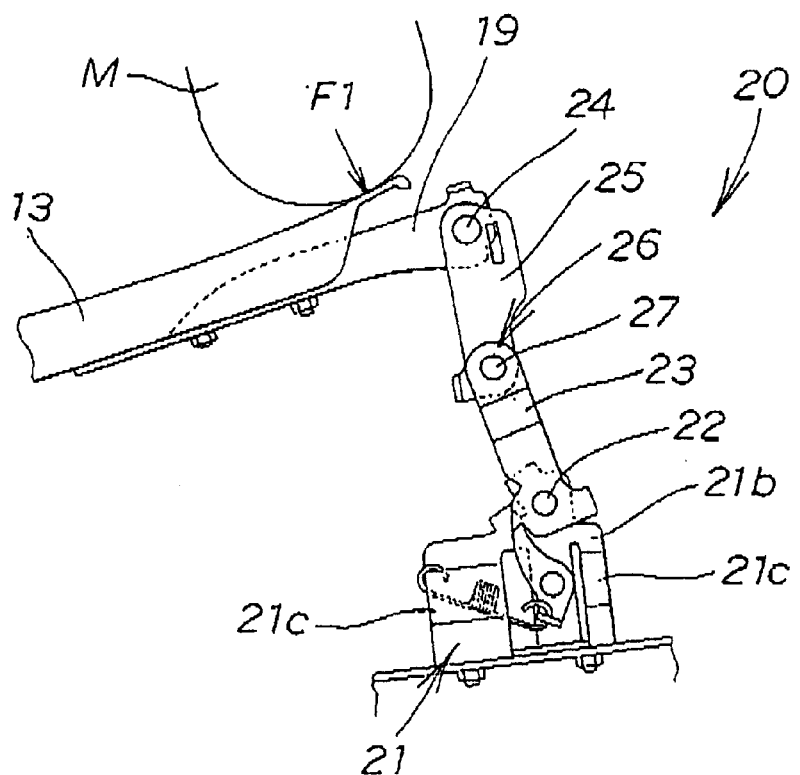
FIG. 19A and FIG. 19B are functional diagrams showing the hood retaining mechanism when an object to be protected comes into secondary collision with the top surface of the hood in the vicinity of the hood retaining mechanism, with a bracket buckling and deforming.
Figure 19B:
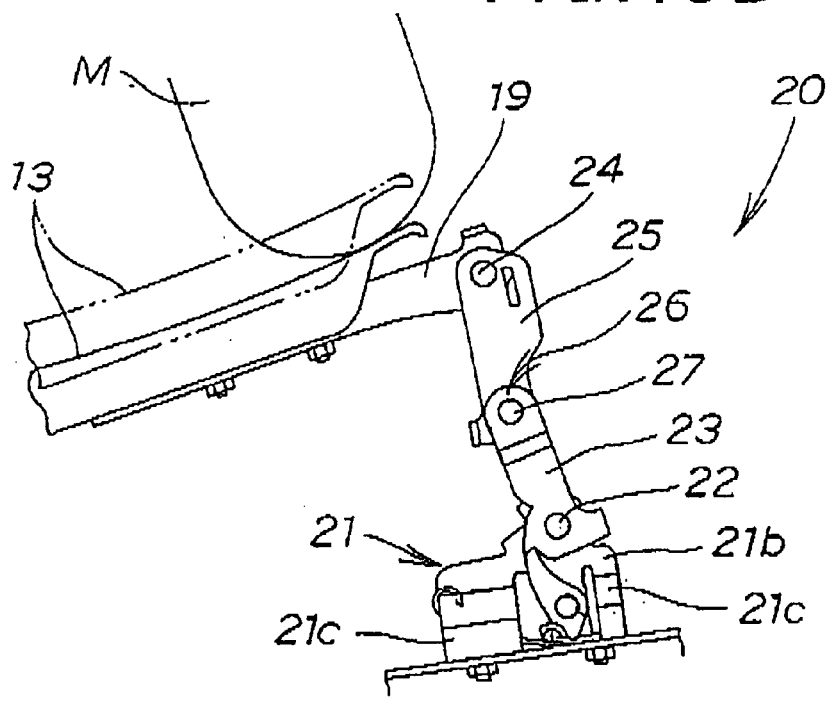

FIGS. 19A and 19B show the function of the hood retaining mechanism when the object M to be protected secondarily collides with the rear end of the hood 13.

The object M to be protected can collide with the hood 13 at any position. For example, as shown in FIG. 19A, the object M to be protected may collide with a part on the hood 13 in the vicinity of the hood retaining mechanism 20. At that time, a strong downward force F1 acts on the hood retaining mechanism 20. The impactive force F1 acting on the hood 13 resultantly acts as a strong downward force on the section C-shaped part 21c of the bracket 21 through the hood 13, arm 19, second pin 24, upper link 25, third pin 27, lower link 23, first pin 22, and the wall 21 of the bracket 21 in this order.

When receiving the downward force F1 which exceeds a predetermined strength, the section C-shaped part 21c largely buckles as shown in FIG. 19B to sufficiently absorb the force F1. Thus the impact to the object M to be protected is sufficiently mitigated. The bracket 21 serves the above function with the simple structure including the section C-shaped part 21c formed with the wall 21b. Thus adapting the section C-shaped part 21c to buckle appropriately under a predetermined force allows flexible and facilitated adjustment of the deforming property of the bracket 21.

Now, the function of the hood apparatus 10 when the vehicle 11 collides with a wall W or something other than the object M to be protected will be described with reference to FIGS. 20 and 21.

Figure 20:
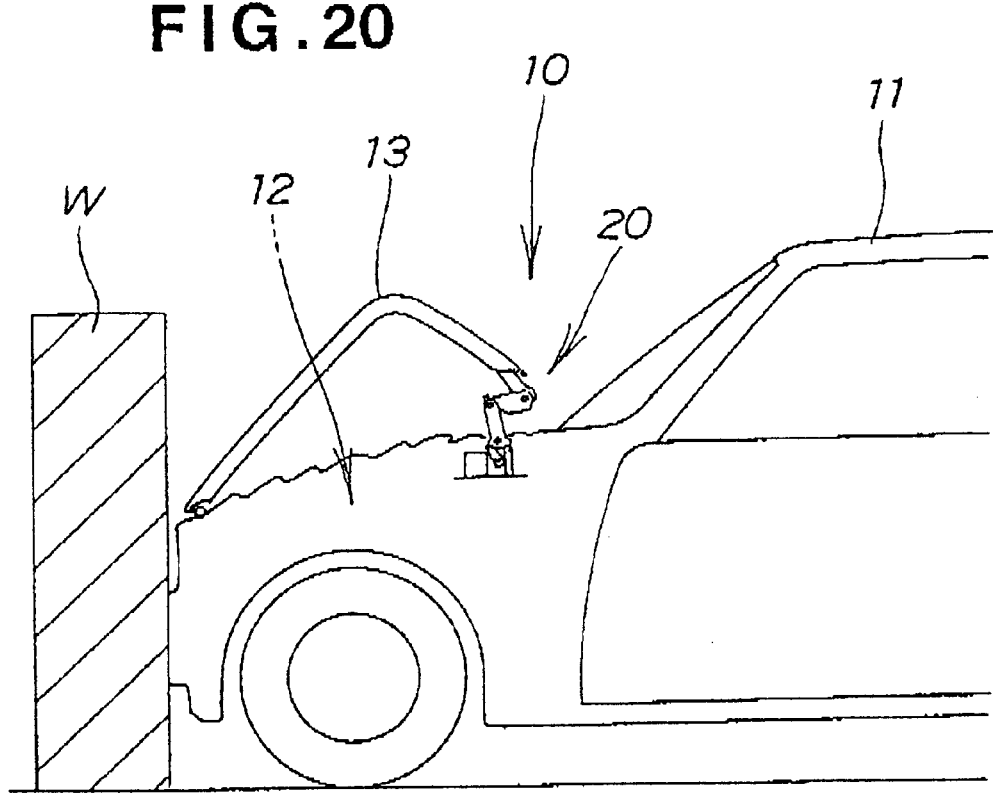
FIG. 20 shows the hood deformed upon the collision between the vehicle and an object such as a wall instead of an object to be protected.

FIG. 20 shows a case where the vehicle 11 collides with a strong wall W or a similar thing. In such an instance, the vehicle 11 absorbs the collision impact by the deformation of the engine room 12 and the hood 13. The hood 13 deforms with the middle part thereof projected upward as shown in the figure. At that time, the hood apparatus 10, in response to a detection signal from the bumper sensor 17, lifts the rear end of the hood 13 via the lifting actuator 40 as shown in FIG. 17 and retains the hood retaining mechanism 20 in the lifted position.

Figure 21:
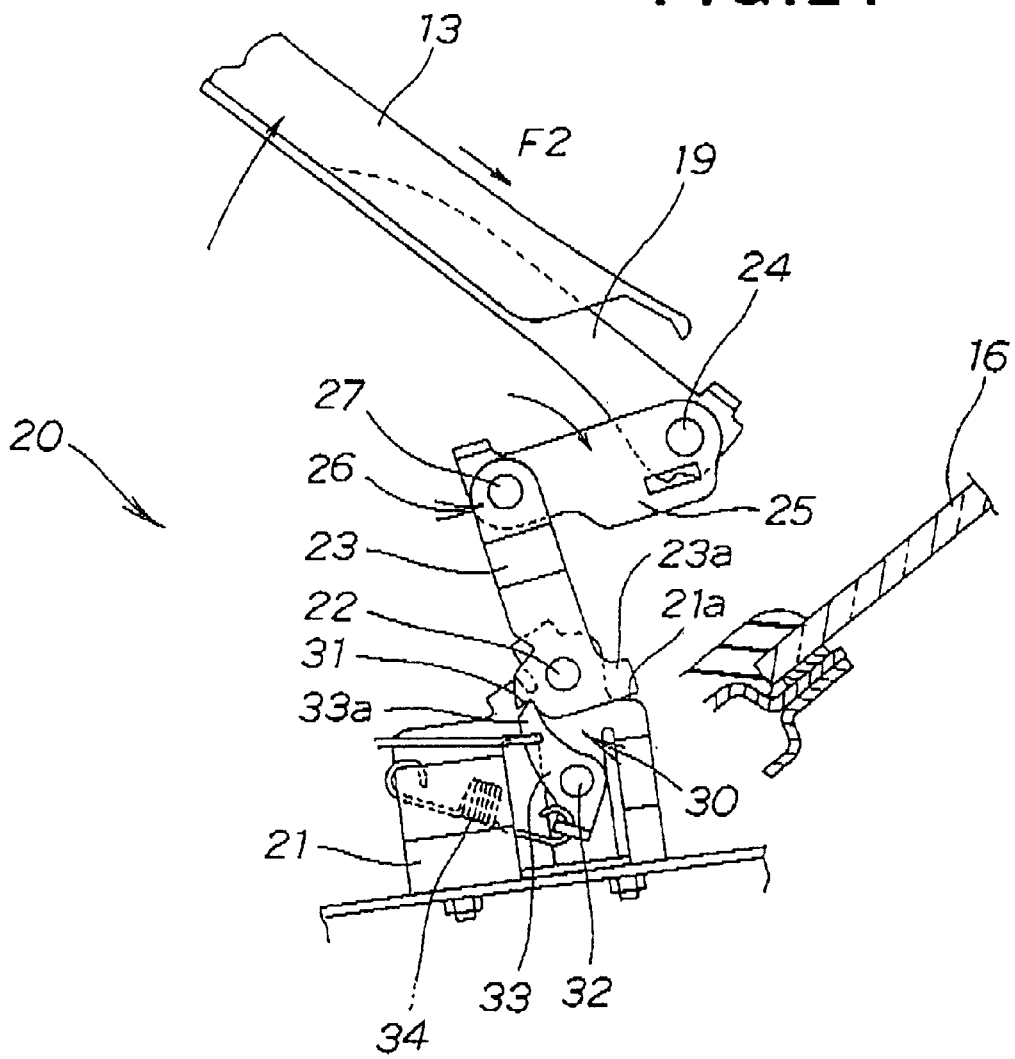
FIG. 21 is a functional diagram showing the hood retaining mechanism with the deformed hood.

FIG. 21 shows a state where the hood 13 is deformed just after the expansion of the hood retaining mechanism 20.

Since the lower stopper 23a abuts against the upper end 21a of the bracket 21, the lower link 23 is prevented from falling rearward relative to the vehicle.

When the middle part of the hood 13 is deformed to project upward, an impactive force F2 from the hood 13 acts as a backward force on the second pin 24 through the arm 19. The backward force causes the upper link 25 to swing clockwise on the third pin 27. Thus, since only the upper link 25 swings, the rearward motion of the rear end of the hood 13 and the arm 19 is restricted. The hood 13 and the arm 19 are prevented from approaching the windshield 16 more than is necessary.

The present invention is not limited to the embodiment as shown in the figures, and can be modified appropriately within the scope of the following claims. For example, the arm 19 as shown in FIG. 3 may be eliminated and the rear end of the hood 13 may be directly attached to the hood retaining mechanism 20.

Further, in the present invention, the lower stopper 23a may be provided in the bracket 21 as shown in FIG. 3 to cause the lower stopper 23a to abut against the lower link 23. Furthermore, the upper stopper 25a may be provided in the lower link 23 to cause the upper stopper 25a to abut against the upper link 25.

The ratchet mechanism 30 may be of any sort as long as it is provided between the bracket 21 and the lower link 23. For example, the ratchet recess 31 may be provided in the bracket 21 and the ratchet pawl 33 may be provided in the lower link 23.

In the present invention, the number of lifting and pulling actuators 40, 50 is arbitrary. Those actuators 40, 50 may be separated instead of being accommodated in the single housing 41. Further, the actuators 40, 50 are not limited to a structure in which the pistons are moved under gas production pressure, and may be electric motor-driven actuators.

The vehicle hood apparatus 10 may be of a structure in which a manual switch is provided in the passenger compartment and the driver operates the switch to activate the pulling actuator 50, for example. For this structure, steps ST03 and ST04 as shown in FIG. 6 can be changed to a step of determining the presence or absence of a switch signal.

A pulling member for pulling up the ratchet pawl 33 by the pulling actuator is not limited to the pulling wire 55 and may be a rod, for example.

Obviously, various minor changes and modifications of the present invention are possible in the light of the above teaching. It is therefore to be understood that within the scope of the appended claims, the invention may be practiced otherwise than as specifically described.

What is claimed is:

1. A vehicle hood apparatus comprising:
   a hood for covering an engine room positioned in the front section of a vehicle;
   a lifting actuator for lifting the rear end of said hood a predetermined amount when the vehicle collides with an object to be protected; and
   a hood retaining mechanism for retaining said hood in the lifted position;
   said hood retaining mechanism comprising:
      a bracket mounted to a body frame;
      a lower link swingably mounted to said bracket at a first location;
      an upper link swingably mounted to the rear end of said hood at a second location;
      a hinge for bendably and stretchably mounting said lower link and said upper link such that said hinge is offset from at least one of said first and second locations in a forward direction relative to the vehicle;
      a stopper provided between said lower link and said bracket for preventing said lower link from falling rearward relative to the vehicle subsequent to the stretching of said lower link and said upper link; and
      a ratchet mechanism provided between said lower link and said bracket for allowing said lower link and said upper link to shift from a bending state to a stretching state while preventing the reverse shift.

2. A hood apparatus as set forth in claim 1, wherein said bracket is configured to buckle and deform when a downward load exceeding a predetermined amount acts on said bracket.

3. A hood apparatus as set forth in claim 1, further comprising a pulling actuator for pulling a ratchet pawl of said ratchet mechanism in a disengaging direction.

4. A hood apparatus as set forth in claim 3, wherein said pulling actuator is activated after a predetermined lapse of time since the lifting of said hood, to disengage said ratchet mechanism and return said hood to the original closing position.

* * * * *